United States Patent Office 3,781,365
Patented Dec. 25, 1973

3,781,365
STABILIZATION OF AQUEOUS FORMALDEHYDE SOLUTIONS
Roy H. Prinz, Robstown, and Bob C. Kerr, Kingsville, Tex., assignors to Celanese Corporation, New York, N.Y.
No Drawing. Application Dec. 13, 1967, Ser. No. 690,059, which is a continuation-in-part of application Ser. No. 360,137, Apr. 15, 1964, which is a continuation-in-part of application Ser. No. 77,525, Dec. 22, 1960, now abandoned, which in turn is a continuation-in-part of applications Ser. No. 811,250, May 18, 1959, now Patent No. 3,137,736, Ser. No. 744,059, June 24, 1958, and Ser. No. 858,868, Dec. 11, 1959, both now abandoned. Divided and this application Jan. 5, 1970, Ser. No. 5,407
Int. Cl. C07c 47/04
U.S. Cl. 260—606   3 Claims

ABSTRACT OF THE DISCLOSURE

One aspect of this invention relates to the stabilization of aqueous solutions of formaldehyde with a small amount of a sorbitan ester of a higher fatty acid.

Another aspect of the invention includes the heat treatment of an aqueous formaldehyde solution containing a small amount of any of certain dissolved organic colloids as a stabilizer, to further increase the stabilization of the solution.

---

This application is a division of application Ser. No. 690,059, filed Dec. 13, 1967, which in turn is a continuation-in-part of our application Ser. No. 360,137, filed Apr. 15, 1964, which is a continuation-in-part of application Ser. No. 77,525, filed Dec. 22, 1960, now abandoned which is a continuation-in-part of applications Ser. Nos. 858,868, filed Dec. 11, 1959, now abandoned; 811,250, filed May 18, 1959, now U.S. Pat. 3,137,736, and 744,059, filed June 24, 1958, now abandoned.

Aqueous solutions of formaldehyde of over 30% concentration tend to become cloudy, with the formation of formaldehyde polymers. It has long been known that it is desirable to have more highly concentrated solutions of formaldehyde in order to save the expenses of shipping and handling large quantities of water with the formaldehyde. To this end methanol has been added as a stabilizer. Thus ordinary commercial formaldehyde, containing 37% formaldehyde by weight, generally contains about 8 to 15% methanol to prevent precipitation of polymers. The presence of such large amounts of methanol is not always desirable, since it interferes with some reactions in which formaldehyde is employed. In addition, even when the methanol has no deleterious effect, the presence of an appreciable proportion of this material serving only a stabilizing function, necessarily adds to the cost of the solution. Also, even with such large amounts of methanol the concentration of formaldehyde obtainable in a stable solution is not as high as desired.

It is therefore one object of this invention to produce stable concentrated formaldehyde solutions of relatively low methanol content.

Another object of this invention is the provision of novel stabilizers for formaldehyde, which stabilizers are effective even when present in very small proportions.

Other objects of this invention will be apparent from the following detailed description and claims. In this description and claims all proportions are by weight unless otherwise indicated.

In accordance with one aspect of the invention a stabilizer is used for aqueous formaldehyde solutions comprising an ester of sorbitan and a higher fatty acid. The ester may be a mono-, di- or triester of sorbitan or a mixture of these esters e.g. a "sesqui" ester. However the ester may be unmodified or may be etherified with a monohydric or polyhydric alcohol.

The higher fatty acid which may be used to prepare the sorbitan ester generally contains at least 8 and as many as 20 or even a larger number of carbon atoms. Examples of such fatty acids which may be saturated or unsaturated are lauric, oleic, palmitic, stearic, caprylic and arachidic.

Alcohols which may be used to etherify the sorbitan ester are preferably higher monohydric alcohols, e.g. containing 8 to 20 carbon atoms or polyhydric alcohols. Alcohols which may be used are capryl, lauryl, cetyl and stearyl alcohol and glycerol, ethylene glycol, trimethylol propane, trimethylol ethane, trimethylol butane and pentaerythritol.

Sorbitan esters contemplated are sorbitan monolaurate (Span 20 or Arlacel 20), sorbitan mono-oleate (Span 80 or Arlacel 80), sorbitan trioleate (Span 85 or Arlacel 85), sorbitan monopalmitate (Span 40 or Arlacel 40), sorbitan sesquioleate (Span 83 or Arlacel 83), sorbitan mono stearate (Span 60 or Arlacel 60), sorbitan monolaurate mono glycerol ether and sorbitan monolaurate monolauryl ether. "Span" and "Arlacel" are trademarks of Atlas Chemical Industries, Inc.

In accordance with another aspect of this invention an aqueous formaldehyde solution which has incorporated therein any of certain classes of colloid which acts to stabilize the solution, is heat treated to further stabilize the solution generally by simply heating the solution to a sufficiently high temperature and allowing it to cool.

The treatment may be carried out by heating the solution to an elevated temperature, e.g. 55° C. to the boiling point of the solution and cooling. The solutions may be cooled immediately on its reaching the desired temperature or it may be kept at the elevated temperature for a definite period e.g. up to 3 or more hours.

Advantageously the colloid used in the heat treated solution is soluble in the aqueous formaldehyde without coloring or clouding the formaldehyde solution.

Classes of water dispersible colloids which may be used in conjunction with the heat treatment are proteins such as gelatin, e.g. calf gelatin or pig gelatin, zein and albumin, and water dispersible natural polysaccharides such as pectins, Irish moss extract (carrageenan), and starch.

The proportions of colloid may be very small and the colloid may be one which does not dissolve completely uniformly in aqueous formaldehyde when it is present in the amount utilized, e.g. 500 p.p.m. (based on the weight of the solution); that is, the colloid-containing solutions at this concentration and at higher concentrations (e.g. 1000 p.p.m.) although clear, may have a granular appearance. However, the colloid may act as an excellent stabilizer even at much lower concentrations, for example less than 100 p.p.m., e.g. 10 p.p.m., and these lower concentrations are more desirable since the resulting solutions have less tendency to foam and it is usually preferable to use very small amounts, generally less than about 0.5% of dry colloid (based on the weight of the solution). Preferably the amount of colloid is such that the addition thereof has no substantial effect on the viscosity of the formaldehyde solution.

The concentration of formaldehyde is desirably above 30% since with lower concentrations the problem of stability is not significant. The present invention makes possible stable formaldehyde solutions of well over 40% concentration, even when little or no methanol is present.

The stability of aqueous formaldehyde depends, as is well known, on the temperature. A solution which is not stable when stored at room temperature may remain substantially unchanged when stored at higher temperatures, e.g. 50° C. Similarly, cooling of concentrated aqueous formaldehyde decreases its stability and causes the formation of solid polymer. Like ordinary concentrated aqueous formaldehyde solutions, the solutions of the present invention may be solidified to form a paste, or in some cases, a slurry, by holding them at a low temperature for a sufficient time and may then be reliquified by heating. However, with the solutions of the present invention the reliquefaction takes place without the formation of any substantial quantity of insoluble polymers of formaldehyde, even after many cycles of solidification and liquefaction. In contrast when conventional concentrated formaldehyde solutions are solidified in this manner a considerable residue of insoluble polymer is formed, the amount of insoluble polymer increasing with each cycle of solidification and liquefaction.

The solutions of the present invention may be used for the same purposes as conventional solutions of formaldehyde. When reacted with urea, they have the further advantage of yielding resins of improved clarity.

If desired, the aqueous formaldehyde may be treated, before or after the addition of the hydrophilic colloid, to remove ions therefrom. Such ions may be metallic ions (e.g., iron) picked up by the solution as a result of contact with metallic equipment, or formate ions resulting from the Cannizzaro reaction in which two molecules of formaldehyde react to form a molecule of formic acid and a molecule of methanol. Removal of ions may be effected by passing the solution through one or more ion-exchange resins. Anion-exchange resins, alone or in combination with a cation-exchange resin treatment may be employed, as is conventional in the art. Solutions from which the ions have been removed have improved stability.

The formaldehyde solutions of high concentration may be produced in well-known manner, as by dissolving gaseous formaldehyde or solid paraformaldehyde in water, or by vacuum concentration of dilute aqueous formaldehyde, or by pressure distillation of dilute aqueous formaldehyde, taking off a concentrated aqueous formaldehyde overhead, or by any suitable combination of these. The colloids used in this invention may be conveniently dissolved in the freshly prepared concentrated solutions (or, when appropriate, may be dissolved in the solution being concentrated). The pH of the solution may be varied, but for best results should not be such as to cause precipitation of the dissolved colloid; similarly, any anions or cations which tend to precipitate the colloid should be avoided, for best results.

The following examples are given to illustrate this invention further.

EXAMPLE I

To a freshly prepared aqueous 42.5% solution of formaldehyde (produced as a product of the partial oxidation, with air or oxygen, of an aliphatic hydrocarbon, e.g. propane, or butane), containing 1% methanol there was added sorbitan monolaurate, used in proportions of 50 p.p.m. and 100 p.p.m. This compound sold under the trademark Arlacel 20, is a lipophilic yellow oily liquid having an HLB, Atlas of 8.6, a viscosity at 25° C. of 5000 cps., and is soluble in mineral oil.

The stabilizer was incorporated by first dissolving it, in 5% concentration, in methanol, then adding water, and then adding the water-methanol solution to the aqueous formaldehyde solution in amount such that the final concentration of formaldehyde was 42%; the stabilized formaldehyde solution was clear. The stability periods at 73° C. were 3 days (for 50 p.p.m.) and 16 days (for 100 p.p.m.). At this temperature the same formaldehyde solution, to which no stabilizer was added, was unstable, i.e., it showed polymerization in less than one day.

EXAMPLE II

Example I was repeated, using as the stabilizer 100 p.p.m. of lipophilic glycerol sorbitan laurate (Atlas C-672, a light amber oily liquid whose HLP, Atlas, is 7.6). The stability period of the resulting formaldehyde solution was 7 days at 73° F.

EXAMPLE III

To freshly prepared aqueous solutions of formaldehyde of 46.89% concentration there were added 100 p.p.m. of one of the following colloids, respectively: Sure Jell (a powdered pectin preparation manufactured by General Foods Corp., New York, N.Y., for making homemade jams and jellies, and containing fruit pectin together with dextrose and citric acid); water soluble Irish moss extractives (carrageenan, in mixed lambda and kappa forms, sold under the trademark "Sea-Kem" of which various viscosity grades were tested including "type 3" having a water viscosity of 90–125° MacMichael or about 400–570 centipoises; "type 6" having a water viscosity 400–500° MacMichael or about 1800–2200 centipoises; "type 8" having a water viscosity of 10–20° MacMichael or about 45–90 centipoises; and "type 14" having a water viscosity of 10–40° MacMichael or about 45–180 centipoises); and calf gelatin ("Knox gelatin"). The resulting solutions were then maintained at 38° C. for 20 days; none of them showed observable polymerization during this period. The stability of the solutions may be improved by bringing them to a boil and allowing them to cool.

EXAMPLE IV

To the unstabilized formaldehyde solution of Example I there was added 1000 p.p.m. of raw egg white. The resulting cloudy solution was stable for 6 days. The stability of the solution may be improved by bringing it to a boil and cooling.

EXAMPLE V

Aqueous formaldehyde of 40% concentration was well stabilized by the addition of 0.1% of Burtonite V–40–E (carrageenan extract from Burtonite Company). The stability could be improved by bringing the solution to a boil and cooling.

EXAMPLE VI

In this example, 0.1% of zein was added to a 40.5% aqueous formaldehyde solution and the solution was brought to the boil and then cooled. In two other experiments, starch and pectin-free amylose were substituted, respectively, for the zein, using the same procedure. Solutions of improved stability are obtained.

In the above examples the pH of the unstabilized formaldehyde solution was within the range of about 3–7, e.g., 5.5.

The stabilizers of this invention may be used in the production of highly concentrated melts (having concentrations of formaldehyde of above 80% for instance) by the evaporation of water from aqueous formaldehyde. These melts are useful in making paraformaldehyde. When the stabilizers of this invention are present there is less tendency for deposits of solid polymer to form on the heated pipes or other heated containers used for transferring the held molten material. However, the stabilizers of this invention have found their greatest utility in aqueous formaldehyde of about 40 to 50% concentration.

It has also been found that the presence of a colloid in very small proportions has the effect of inhibiting the crossed-Cannizzaro reaction, by which reaction formaldehyde is converted to methanol and formic acid. Thus, when aqueous formaldehyde was tested in accordance with the Pajunen method described in "Formaldehyde" by J. F. Walker, 2nd ed. (Reinhold Publishing Corp.), it was found that the incorporation of a water-dispersible colloid decreased the amount of formic acid formed at room temperature over a 4 day period. Very good results were obtained with carrageenan (e.g., 1–100 p.p.m. of Sea-Kem type 3) and pectin (e.g. 10 p.p.m. of Sure Jell). A good result was also obtained with algin (e.g. 50 p.p.m. of Kelgin). These proportions are based on the weight of a 42% formaldehyde solution. The actual amount present was even less since the formaldehyde solution was diluted to 0.1 N and then further diluted with an equal volume of 0.05 N NaOH, for the test. Since it is very desirable that aqueous formaldehyde form as little acid as possible on storage the addition of colloids for this purpose is highly advantageous.

It is to be understood that the foregoing detailed description is given merely by way of illustration and that many variations may be made therein without departing from the spirit of our invention.

The embodiments of the invention in which an exclusive property or privilege is claimed are defined as follows:

1. A solution of from about 30 to 80% of formaldehyde in water, said solution being stabilized by a stabilizing amount of up to about 1000 p.p.m. of an etherified sorbitan ester of a higher fatty acid, said sorbitan ester being etherified with a polyhydric alcohol selected from the group consisting of glycerol, ethylene glycol, trimethylol propane, trimethylol ethane, trimethylol butane and pentaerythritol.

2. The solution of claim 1 wherein said polyhydric alcohol is glycerol.

3. A solution of 30 to 80% of formaldehyde in water, said solution being stabilized by a stabilizing amount up to about 100 p.p.m. of glycerol sorbitan laurate.

References Cited

UNITED STATES PATENTS 3,183,271   5/1965   Halpern et al. _____ 260—606

LEON ZITVER, Primary Examiner

R. H. LILES, Assistant Examiner